US011352261B1

(12) United States Patent
Jiang et al.

(10) Patent No.: US 11,352,261 B1
(45) Date of Patent: Jun. 7, 2022

(54) GRAPHENE-MXENE NANOFLOWER COMPOSITE MATERIAL, PREPARATION METHOD AND APPLICATION THEREOF

(71) Applicant: BEIJING INSTITUTE OF TECHNOLOGY, Beijing (CN)

(72) Inventors: Lan Jiang, Beijing (CN); Yongjiu Yuan, Beijing (CN); Xin Li, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 0 days.

(21) Appl. No.: 17/508,152

(22) Filed: Oct. 22, 2021

(30) Foreign Application Priority Data

Apr. 8, 2021 (CN) .......................... 202110378542.2

(51) Int. Cl.
| | |
|---|---|
| *H01M 4/02* | (2006.01) |
| *C01B 32/184* | (2017.01) |
| *H01G 11/24* | (2013.01) |
| *H01G 11/36* | (2013.01) |
| *B82Y 40/00* | (2011.01) |

(52) U.S. Cl.
CPC .......... *C01B 32/184* (2017.08); *H01G 11/24* (2013.01); *H01G 11/36* (2013.01); *B82Y 40/00* (2013.01); *C01B 2204/22* (2013.01); *C01P 2004/03* (2013.01); *C01P 2004/62* (2013.01); *C01P 2004/64* (2013.01); *C01P 2006/40* (2013.01)

(58) Field of Classification Search
CPC ....................................................... H01M 4/02
See application file for complete search history.

(56) References Cited

U.S. PATENT DOCUMENTS

2020/0328394 A1* 10/2020 Song .................. H01M 50/417

FOREIGN PATENT DOCUMENTS

WO    WO 2018124636    *   5/2018

* cited by examiner

*Primary Examiner* — Jacob B Marks
(74) *Attorney, Agent, or Firm* — Norton Rose Fulbright US LLP

(57) ABSTRACT

The present disclosure relates to a graphene-nanoflower shaped MXene composite material, preparation method and application thereof, which belongs to the field of negative electrode materials for supercapacitors. In the present disclosure, a space-time shaping femtosecond laser is utilized to process MXene target in graphene oxide nanoflake dispersion, so as to synthesize a graphene-nanoflower shaped MXene composite material in one-step. This nanoflower shaped MXene has adjustable size and morphology and an extremely large specific surface area; when it is used in an electrode material for supercapacitors, the supercapacitor exhibits an extremely high specific capacitance and good cycle stability. This method utilizes a space-time shaping femtosecond laser to synthesize the graphene-nanoflower shaped MXene composite material, which is highly controllable, and can be used to uniformly prepare the material in large-scale. It has provided a new way for synthesis of materials.

8 Claims, 5 Drawing Sheets

GRAPHENE-MXENE NANOFLOWER COMPOSITE MATERIAL, PREPARATION METHOD AND APPLICATION THEREOF

This application claims priority to Chinese Patent Application No. 202110378542.2, titled "METHOD FOR MULTI-DIMENSIONAL PREPARATION OF MXENE NANOFLOWERS ON GRAPHENE SUBSTRATE", filed on Apr. 8, 2021, with the China National Intellectual Property Administration, which is incorporated herein by reference in its entirety.

FIELD OF THE INVENTION

The present disclosure relates to a graphene-nanoflower shaped MXene composite material, preparation method and application thereof, and in particular to a method for multidimensional preparation of a graphene-nanoflower shaped MXene composite material by utilizing a space-time shaping femtosecond laser, which belongs to the field of negative electrode materials for supercapacitors.

BACKGROUND OF THE INVENTION

MXene material is a class of transition metal carbide/nitride with two-dimensional layered structures, having a general chemical formula: $M_{n+1}X_nTx$, wherein n=1-3, M stands for early transition metals, e.g., Ti, Zr, V, and Mo, X stands for elements of C or N, and Tx is surface groups, e.g., —OH, —O, —F and —Cl, which is well-known as MXene because it has similar layer structures to graphene. MXene material can be easily prepared, and has huge surface area, high adsorption performance, excellent thermal stability, chemical stability and good kinetic performance. In addition, in the aspect of electrochemical energy storage, MXene has an ultra-high theoretical specific capacitance, and its unique two-dimensional structure enables ions and charges to quickly transfer inside the material. Thus, it is an ideal electrode material for supercapacitors.

However, as MXene material is layered material, it is prone to be self-stacked, causing greatly decrease in its specific surface area. Thus, generally, in order to prevent such phenomenon, some intercalation agents or the method of doping with other materials to form composite materials have been mostly utilized to suppress the self-stacking of MXene. In addition, a composite structure contributes for improving material performance. For example, the composite structure of graphene and MXene has unique advantages in the field of electrochemical energy storage. Graphene can provide adsorption sites for MXene, and make up for the disadvantages of poor conductivity of MXene owing to its ultra-high conductivity. Moreover, MXene material can make its composite material to have extremely-high electrochemical performance owing to its ultra-large specific surface area and electrochemical performance. However, even so, the layered stacking phenomenon still exists in the MXene material, and the layered composition state has not be changed. MXene nanoflowers may change the form of the layered stacking of MXene material, and may provide better performance by controlling structure, morphology, particle size and so on, which can meet various needs of materials, expending its application fields. MXene, as a new two-dimensional material and an electrode material for supercapacitors, has great potential and advantages in electrochemical energy storage, and thus have attracted many studies and attention. But, single MXene flower-shaped materials have limitation in conductivity and stability, which affects its performance of energy storage. Currently, there is no report on the synthesis of graphene-nanoflower shaped MXene composite material.

SUMMARY OF THE INVENTION

The present disclosure provides a graphene-nanoflower shaped MXene composite material, preparation method and application thereof. The nanoflower shaped MXene of the present disclosure has controllable size and morphology, which has solved the problem of layered self-stacking of nanoflower shaped MXenes, and increased its specific surface area, ion conductivity and charge transfer rate, and its electrochemical performance. The nanoflower shaped MXene contains rich oxygen vacancies. It adsorbs on the graphene nanosheet, and the stability of the nanoflower shaped MXene can be enhanced. The preparation method of the present disclosure is efficient, highly repeatable, and suitable for large-scale production, and thus has good industrialization prospect.

The objective of the present disclosure has been realized by the technical solutions below.

The present disclosure provides a graphene-nanoflower shaped MXene composite material comprising a graphene nanosheet and a nanoflower shaped MXene, wherein the nanoflower shaped MXene is uniformly distributed on the graphene nanosheet, and the nanoflower shaped MXene contains an oxygen vacancy.

According to an embodiment of the present disclosure, in the graphene-nanoflower shaped MXene composite material of the present disclosure, the nanoflower shaped MXene has a size of 200 nm-1200 nm, and preferably 300 nm-1000 nm.

According to an embodiment of the present disclosure, in the graphene-nanoflower shaped MXene composite material of the present disclosure, the nanoflower shaped MXene has a shape composed of a plurality of round-headed cylinders which spread out from a central point uniformly toward the surrounding.

According to an embodiment of the present disclosure, the nanoflower shaped MXene has a size of 200-400 nm, 400-500 nm or 900-1200 nm, and a morphology of a single flower shape, a dandelion flower shape or multi-cluster flower shape. Preferably, it has a size of 300 nm, 500 nm or 1000 nm, and a morphology of a single flower shape, a dandelion flower shape or multi-cluster flower shape.

In the graphene-nanoflower shaped MXene composite material of the present disclosure, the nanoflower shaped MXene is uniformly distributed on the graphene nanosheet, and has controllable size and morphology, which has solved the problem of the layered self-stacking of nanoflower shaped MXenes, and increased its specific surface area, ion conductivity and charge transfer rate, and its electrochemical performance. The nanoflower shaped MXene contains rich oxygen vacancies. It adsorbs on the graphene nanosheet, and the stability of the nanoflower shaped MXene can be enhanced.

The present disclosure provides a method for preparing the above-mentioned graphene-nanoflower shaped MXene composite material, comprising:

(1) immersing MXene nanoflakes into a graphene oxide nanoflake dispersion; and (2) in four dimensions consisting of a time dimension and a three-dimensional space consisting of X axis, Y axis and Z axis, processing the MXene nanoflakes immersed in the graphene oxide nanoflake dispersion by use of a space-time shaping femtosecond laser, and performing multi-stage photochemistry modification on the MXene nanoflakes under induction of erupted multi-stage plasma to produce nanoflower shaped MXene, in which the graphene oxide nanoflake is reduced to a graphene nanosheet, and the nanoflower shaped MXene is adsorbed on the graphene nanosheet, to in-situ synthesize a graphene-nanoflower shaped MXene composite material in one-step.

In an embodiment of the present disclosure, the processing by use of the space-time shaping femtosecond laser comprises irradiation, wherein during the irradiation, the laser produces bubbles, and the bubbles produced by the laser in combination with an gas filling device provide a liquid phase environment with bubbles.

In an embodiment of the present disclosure, size and morphology of the nanoflower shaped MXene are controlled by adjusting energy of the space-time shaping femtosecond laser. When the energy is 150 mw, 100 mw and 50 mw, the obtained nanoflower shaped MXene has a size of 200-400 nm, 400-500 nm and 900-1200 nm respectively. Preferably, the nanoflower shaped MXene has a size of 300 nm, 500 nm and 1000 nm respectively, and has a morphology of a single flower shape, a dandelion flower shape and multi-cluster flower shape respectively.

In an embodiment of the present disclosure, the space-time shaping femtosecond laser has a pulse delay of 1-10 ps in the time dimension; and in the three-dimensional space consisting of X axis, Y axis and Z axis, the shaped pulse sequence of the laser has a length of 3-4 cm in Z axis direction, and is focused as a round light spot with a diameter of 3 mm in X axis and Y axis directions.

The present disclosure further provides a method for preparing a supercapacitor which comprises:
spin-coating the above-mentioned graphene-nanoflower shaped MXene composite material on a conductive substrate, and coating a layer of electrolyte, to obtain a supercapacitor.

The present disclosure further provides use of the above-mentioned graphene-nanoflower shaped MXene composite material as an electrode material of a supercapacitor.

In a preferred embodiment of the present disclosure, the method for preparing the graphene-nanoflower shaped MXene composite material comprises the following steps:

(1) immersing MXene nanoflakes into a graphene nanoflake dispersion; and (2) adjusting light path, generating a Gaussian pulse sequence with accurate pulse delay through a pulse shaper, and generating a time interval and a pulse delay of 1-10 ps; controlling the laser energy of the generated pulse sequence by a non-interference attenuator wheel, after being collimated through a diaphragm, entering into a constructed T-shaped lens where the Gaussian pulse sequence is shaped by the T-shaped lens as a spatially shaped pulse sequence distributed in the Z-axis direction and with a length of 3-4 cm in the Z-axis direction; and at last, processing the MXene nanoflakes immersed in the graphene oxide nanoflake dispersion with the femtosecond laser which is adjustable in four-dimensions composed of X axis, Y axis, Z axis and a time dimension; and (3) placing a gas blowing device into a glassware and immersing it into a graphene oxide nanoflake dispersion, to enable the liquid during the processing to fully flow, and after processing for 30 min, drying the mixture solution of a composite material inside the glassware at room temperature under vacuum for 2-3 h, to obtain a graphene-nanoflower shaped MXene composite material.

Beneficial Effects

1. The above-mentioned composite material of nanoflower shaped MXene can be applied as electrode materials for supercapacitors and photocatalytic products. The composite material of nanoflower shaped MXene of the present disclosure, as a new electrode material for supercapacitors, has a very large specific surface area and a fast ion conductivity. The nanoflower shaped MXene adhered on the graphene nanosheet has the advantage of controllable size, slice-shaped density morphology, and abundant oxygen vacancies. Compared with conventional blocky electrode materials, the composite material in the present disclosure enables more active sites to expose, being conducive to rapidly transferring of ions and charges. Furthermore, compared with conventional methods for synthesizing electrode materials, the method of multidimensional preparation of the graphene-nanoflower shaped MXene composite material using a space-time shaping femtosecond laser in the present disclosure is to process MXene nanoflakes in a liquid phase environment of graphene nanoflakes. It can in-situ synthesize the material in one-step, and can control the surface structure of the nanoflower shaped MXene by adjusting laser parameters. Therefore, this method is a novel concept of morphology synthesis, and provides a new way for designing new electrode materials having complex structure.

2. The present invention has simple operation processing, and realizes in-situ one-step preparation, which has high efficiency and good repeatability. The size and shape of the nanoflower shaped MXene can be selectively controlled by adjusting laser parameters. The whole process does not need addition of any other chemical reagents, which is green and pollution-free, has a good potential for large-scale applications, and has a good industrialization prospect. The graphene-nanoflower shaped MXene composite material prepared according to this invention exhibits a very large specific surface area, which is nearly a hundred times higher than the ordinary composite MXene materials. In addition, when being used as a supercapacitor electrode material, the graphene-nanoflower shaped MXene composite material exhibits extremely high specific capacity and cycle stability, which can promote the development of supercapacitor electrode materials and electrochemical energy storage equipment.

DETAILED DESCRIPTION

The method of the present disclosure will be described and illustrated in detail with reference to specific examples. The description is intended to construct the present disclosure rather than limiting the protection scope of the present invention.

Example 1

A supercapacitor was prepared from graphene-nanoflower shaped MXene composite material by using the method as follow.

50 ml, 10 mg/ml of MXene nanoflakes were taken and pressed as a blocky target, and then placed in the middle of a 2×2 cm glassware to which 20 ml of graphene oxide nanoflake dispersion was poured to completely immerse the MXene target. Meanwhile, a gas pipeline of a gas blowing device was inserted into the solution, from which argon was continuously and stably blown into the solution to make the liquid to circulate and flow continuously.

Two sub-pulse lasers with a pulse delay of 10 ps were successfully obtained, by passing the initial Gaussian laser generated from the light source of a femtosecond laser through a pulse shaper. Then, the two sub-pulse lasers having the time delay of 10 ps were collimated through two diaphragms respectively, subsequently adjusted to having an energy of 150 mw through a attenuator wheel, and then transported and collimated through two reflectors and two diaphragms. Finally, they entered into a self-built T-lens by which they were spatially shaped. After that, under the focus of a 10× objective lens, the Gaussian pulse sequence was shaped into a spatially shaped pulse sequence having distribution in the Z-axis direction, with the depth of focus in the Z-axis direction being 3.5 cm. At last, the spot was focused at the position of 3 cm on the MXene target surface, with the upper part of the spot fully interacting with the graphene oxide nanoflake dispersion, so as to perform liquid phase ablation and reduction on the graphene oxide. After the above reaction was performed for 30 min, the mixed solution became clear and the MXene target was almost thoroughly ablated. At this time, 5 ml of the mixed solution was taken into a glassware by using a dropper, and dried in vacuum for 3 hours.

Figure 1:
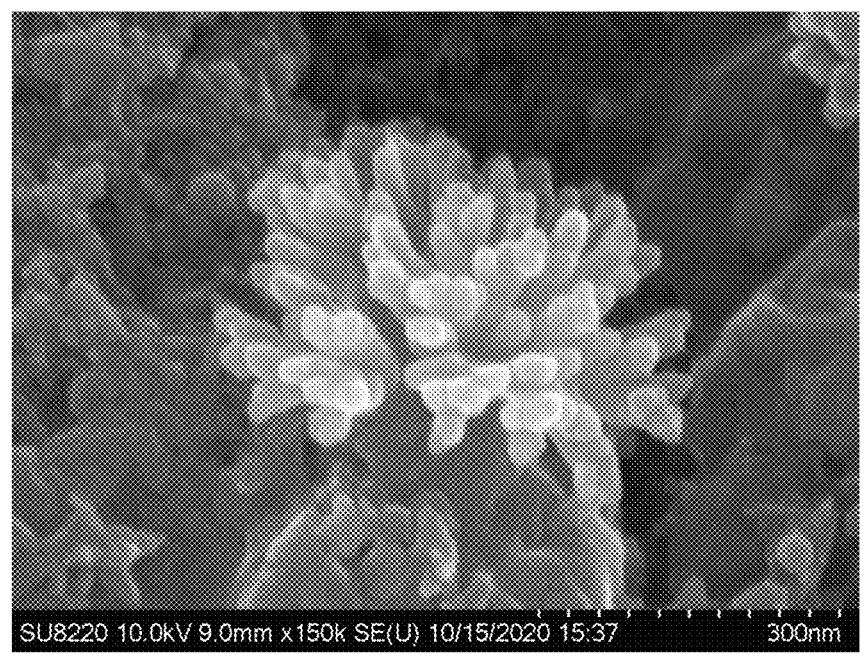
FIG. 1 is a scanning electron microscope (SEM) image of the graphene-nanoflower shaped MXene composite material prepared in Example 1 of the present disclosure.

The nanoflower shaped MXene prepared in this Example had a size of about 300 nanometers and a single flower shape, which was uniformly adsorbed on graphene nanosheets. FIG. 1 is its electron microscope image.

Figure 2:
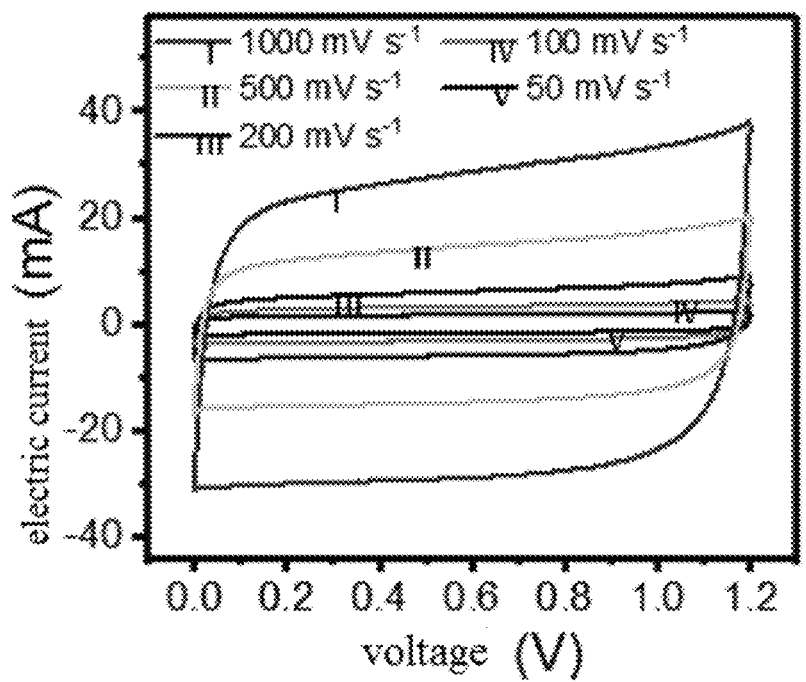
FIG. 2 is CV curves of capacitance of a capacitor using the graphene-nanoflower shaped MXene composite material prepared in Example 1 of the present disclosure as an electrode material of the supercapacitor.
Figure 3:
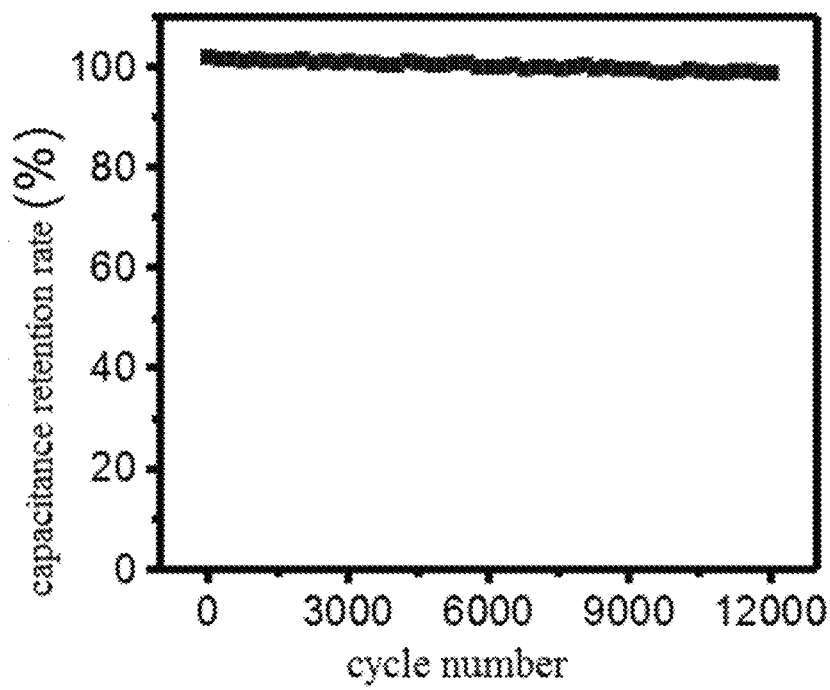
FIG. 3 is cycle life curves of a supercapacitor using the graphene-nanoflower shaped MXene composite material prepared in Example 1 of the present disclosure as an electrode material of the supercapacitor.

The above-mentioned graphene-nanoflower shaped MXene composite material was coated on a gold current collector as an electrode material of a supercapacitor. The prepared supercapacitor was contacted to a chemical workstation with 1 mol/L of dilute sulfuric acid as electrolyte to test its electrochemical performance. FIG. 2 and FIG. 3 are the CV curves and 12000-cycle life curves of the obtained supercapacitor, in which its areal capacitance reaches 320 mF/cm$^2$, and its capacitance retention rate keeps at 99% even after 12000 cycles.

Example 2

A supercapacitor was prepared from a graphene-nanoflower shaped MXene composite material by using the following method.

50 ml, 10 mg/ml of MXene nanoflakes were taken and pressed as a blocky target, and then placed in the middle of a 2×2 cm glassware to which 20 ml of graphene oxide nanoflake dispersion was poured to completely immerse the MXene target. Meanwhile, a gas pipeline of a gas blowing device was inserted into the solution, from which argon was continuously and stably blown into the solution to make the liquid to circulate and flow continuously.

Two sub-pulse lasers with a pulse delay of 10 ps were successfully obtained by passing the initial Gaussian laser generated from the light source of a femtosecond laser through a pulse shaper. Then, the two sub-pulse lasers having the time delay of 10 ps were collimated through two diaphragms respectively, subsequently adjusted to having an energy of 100 mw through a attenuator wheel, and then transported and collimated through two reflectors and two diaphragms. Finally, they entered into a self-built T-lens by which they were spatially shaped. After that, under the focus of a 10× objective lens, the Gaussian pulse sequence was shaped into a spatially shaped pulse sequence having distribution in the Z-axis direction, with the depth of focus in the Z-axis direction being 3.5 cm. At last, the spot was focused at the position of 3 cm on the MXene target surface, with the upper part of the spot fully interacting with the graphene oxide nanoflake dispersion, so as to perform liquid phase ablation and reduction on the graphene oxide. After the above reaction was performed for 30 min, the mixed solution became clear and the MXene target was almost thoroughly ablated. At this time, 5 ml of the mixed solution was taken into a glassware by using a dropper, and dried in vacuum for 3 hours.

Figure 4:
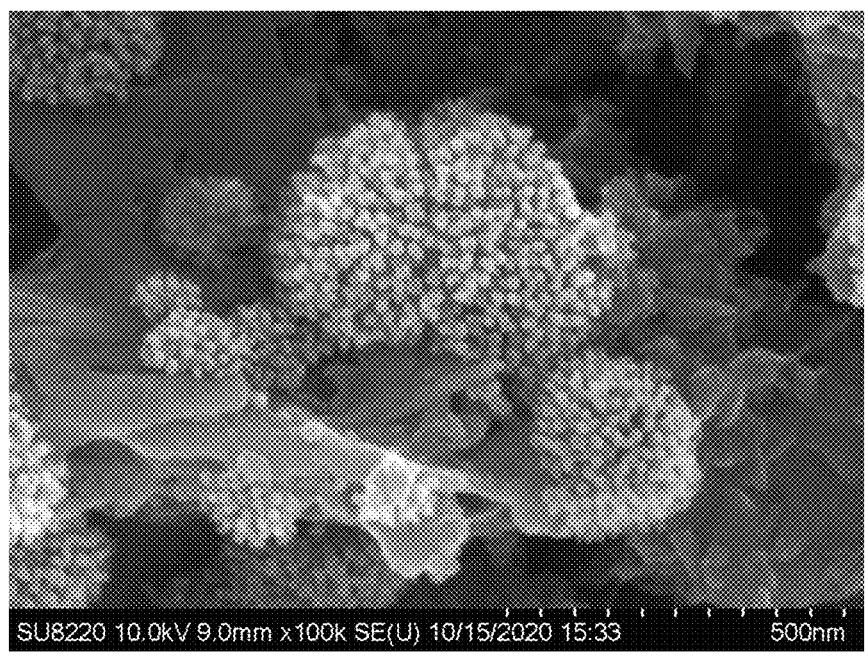
FIG. 4 is a scanning electron microscope (SEM) image of the graphene-nanoflower shaped MXene composite material prepared in Example 2 of the present disclosure.

The nanoflower shaped MXene prepared in this Example had a size of about 500 nanometers and a dandelion flower shape, which was uniformly adsorbed on graphene nanosheets. FIG. 4 is its electron microscope image.

Figure 5:
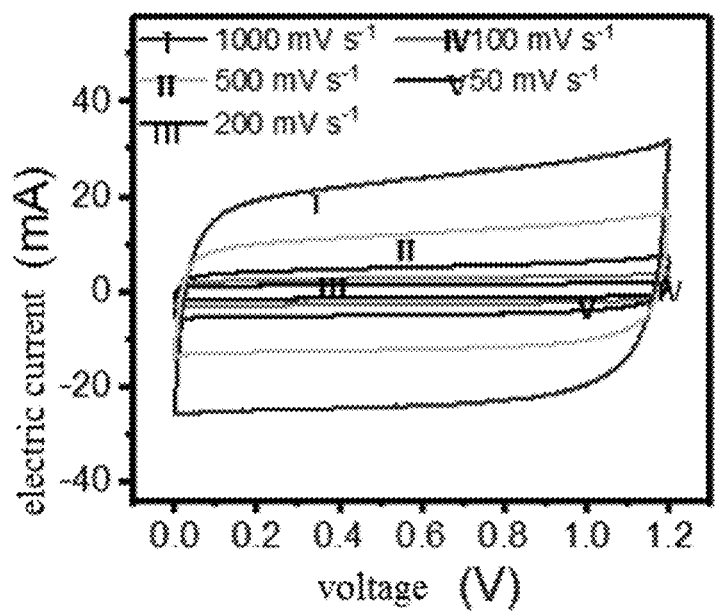
FIG. 5 is CV curves of capacitance of a capacitor using the graphene-nanoflower shaped MXene composite material prepared in Example 2 of the present disclosure as an electrode material of the supercapacitor.
Figure 6:
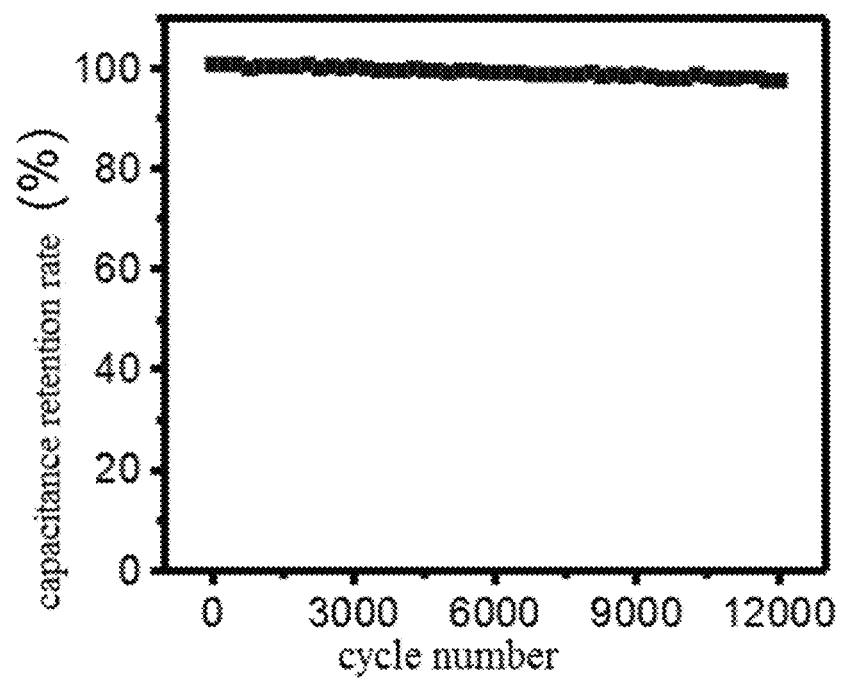
FIG. 6 is cycle life curves of a supercapacitor using the graphene-nanoflower shaped MXene composite material prepared in Example 2 of the present disclosure as an electrode material of the supercapacitor.

The above-mentioned graphene-nanoflower shaped MXene composite material was coated on a gold current collector as an electrode material of a supercapacitor. The prepared supercapacitor was contacted to a chemical workstation with 1 mol/L of dilute sulfuric acid as electrolyte to test its electrochemical performance. FIG. 5 and FIG. 6 are the CV curves and 12000-cycle life curves of the obtained supercapacitor, in which its areal capacitance reaches 302 mF/cm$^2$, and its capacitance retention rate keeps at 98% even after 12000 cycles.

Example 3

A supercapacitor was prepared from a graphene-nanoflower shaped MXene composite material by using the following method.

50 ml, 10 mg/ml of MXene nanoflakes were taken and pressed as a blocky target, and then placed in the middle of a 2×2 cm glassware to which 20 ml of graphene oxide nanoflake dispersion was poured to completely immerse the MXene target. Meanwhile, a gas pipeline of a gas blowing device was inserted into the solution, from which argon was continuously and stably blown into the solution to make the liquid to circulate and flow continuously.

Two sub-pulse lasers with a pulse delay of 10 ps were successfully obtained by passing the initial Gaussian laser generated from the light source of a femtosecond laser through a pulse shaper. Then, the two sub-pulse lasers having the time delay of 10 ps were collimated through two diaphragms respectively, subsequently adjusted to having an energy of 50 mw through a attenuator wheel, and then transported and collimated through two reflectors and two diaphragms. Finally, they entered into a self-built T-lens by which they were spatially shaped. After that, under the focus of a 10× objective lens, the Gaussian pulse sequence was shaped into a spatially shaped pulse sequence having distribution in the Z-axis direction, with the depth of focus in the Z-axis direction being 3.5 cm. At last, the spot was focused at the position of 3 cm on the MXene target surface, with the upper part of the spot fully interacting with the graphene oxide nanoflake dispersion, so as to perform liquid phase ablation and reduction on the graphene oxide. After the above reaction was performed for 30 min, the mixed solution became clear and the MXene target was almost thoroughly ablated. At this time, 5 ml of the mixed solution was taken into a glassware by using a dropper, and dried in vacuum for 3 hours.

Figure 7:
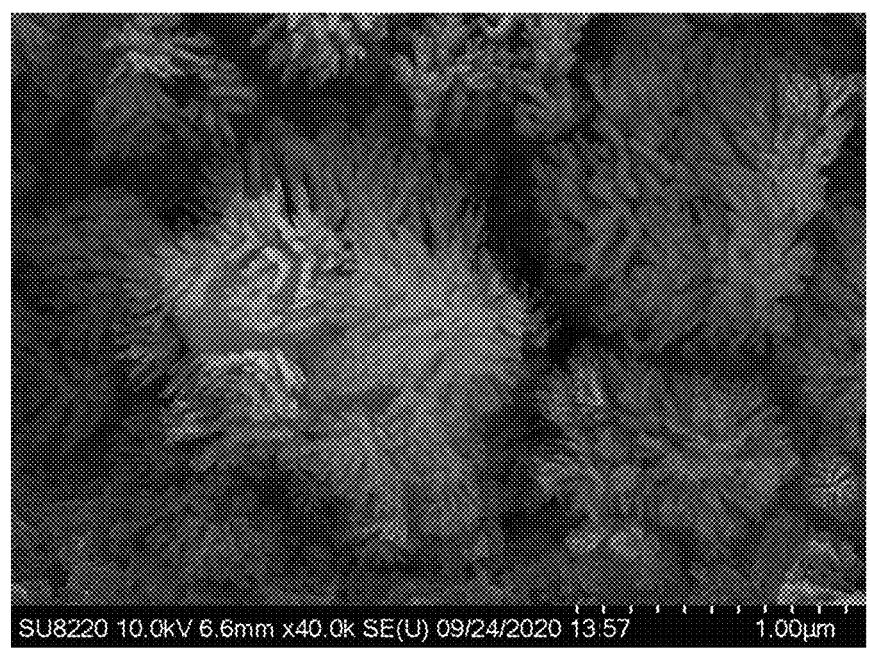
FIG. 7 is a scanning electron microscope (SEM) image of the graphene-nanoflower shaped MXene composite material prepared in Example 3 of the present disclosure.

The nanoflower shaped MXene prepared in this Example had a size of about 1000 nanometers and a multi-cluster flower shape, which was uniformly adsorbed on graphene nanosheets. FIG. 7 is its electron microscope image.

Figure 8:
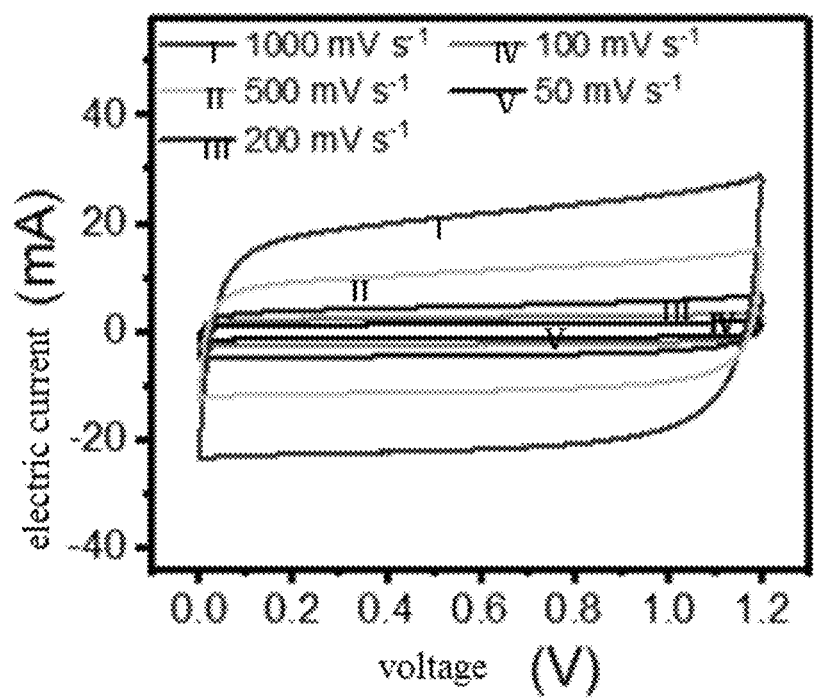
FIG. 8 is CV curves of capacitance of a capacitor using the graphene-nanoflower shaped MXene composite material prepared in Example 3 of the present disclosure as an electrode material of the supercapacitor.
Figure 9:
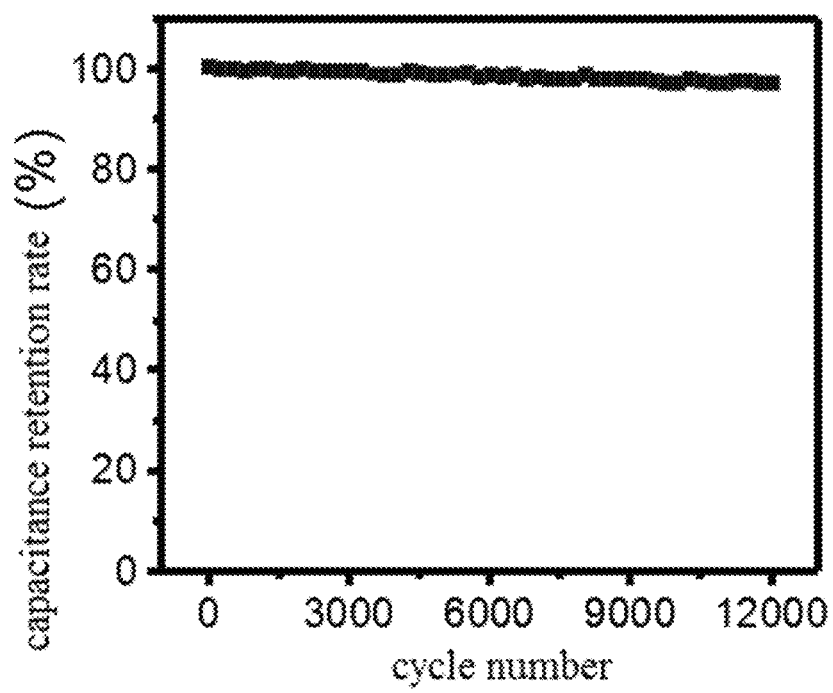
FIG. 9 is cycle life curves of a supercapacitor using the graphene-nanoflower shaped MXene composite material prepared in Example 3 of the present disclosure as an electrode material of the supercapacitor.

The above-mentioned graphene-nanoflower shaped MXene composite material was coated on a gold current collector as an electrode material of a supercapacitor. The prepared supercapacitor was contacted to a chemical workstation with 1 mol/L of dilute sulfuric acid as electrolyte to test its electrochemical performance. FIG. 8 and FIG. 9 are the CV curves and 12000-cycle life curves of the obtained supercapacitor, in which its areal capacitance reaches 295 mF/cm$^2$, and its capacitance retention rate keeps at 97.5% even after 12000 cycles.

The above specific description is merely used to further describe the purpose, technical solutions and beneficial effects of the invention in detail. It should be understood that it is only specific examples of the present disclosure and is not intended to limit the protection scope of the present invention. Any modification, equivalent replacement, improvement, etc., made within the spirit and principle of the present disclosure should all be included in the protection scope of the present invention.

The invention claimed is:

1. A graphene-nanoflower shaped MXene composite material, comprising a graphene nanosheet and a nanoflower shaped MXene, wherein:
   the nanoflower shaped MXene is uniformly distributed on the graphene nanosheet; and
   the nanoflower shaped MXene contains an oxygen vacancy.

2. The graphene-nanoflower shaped MXene composite material according to claim 1, wherein the nanoflower shaped MXene has a size of 200 nm-1200 nm.

3. The graphene-nanoflower shaped MXene composite material according to claim 1, wherein the nanoflower shaped MXene has a shape composed of a plurality of round-headed cylinders which spread out from a central point uniformly toward the surrounding.

4. A method for preparing the graphene-nanoflower shaped MXene composite material according to claim 1, comprising:
   immersing MXene nanoflakes into a graphene oxide nanoflake dispersion; and
   in four dimensions consisting of a time dimension and a three-dimensional space consisting of X axis, Y axis and Z axis, processing the MXene nanoflakes immersed in the graphene oxide nanoflake dispersion by use of a space-time shaping femtosecond laser, and performing multi-stage photochemistry modification on the MXene nanoflakes under induction of erupted multi-stage plasma to produce nanoflower shaped MXene, in which the graphene oxide nanoflake is reduced to a graphene nanosheet, and the nanoflower shaped MXene is adsorbed on the graphene nanosheet, to in-situ synthesize a graphene-nanoflower shaped MXene composite material in one step.

5. The method according to claim 4, wherein the processing by use of the space-time shaping femtosecond laser comprises irradiation, wherein:
   during the irradiation, the laser produces bubbles, and the bubbles produced by the laser in combination with an gas filling device provide a liquid phase environment with bubbles.

6. The method according to claim 4, wherein size and morphology of the nanoflower shaped MXene are controlled by adjusting energy of the space-time shaping femtosecond laser, in which:
   when the energy is 150 mw, 100 mw and 50 mw, the obtained nanoflower shaped MXene has a size of 300 nm, 500 nm and 1000 nm respectively, and has a morphology of a single flower shape, a dandelion flower shape and a multi-cluster flower shape respectively.

7. The method according to claim 6, wherein the space-time shaping femtosecond laser has a pulse delay of 1-10 ps in the time dimension; and
   in the three-dimensional space consisting of X axis, Y axis and Z axis, the shaped pulse sequence of the laser has a length of 3-4 cm in Z axis direction, and is focused as a round light spot with a diameter of 3 mm in X axis and Y axis directions.

8. A method for preparing a supercapacitor, comprising spin-coating the graphene-nanoflower shaped MXene composite material according to claim 1 on a conductive substrate, and coating a layer of electrolyte, to obtain a supercapacitor.

* * * * *